United States Patent [19]

Takenaka et al.

[11] Patent Number: 4,509,803
[45] Date of Patent: Apr. 9, 1985

[54] SLIDING MEMBER HAVING A NOVEL PORE STRUCTURE ON THE SLIDING SURFACE THEREOF

[75] Inventors: Akira Takenaka; Keiichi Shimasaki, both of Nagoya; Yasumitsu Kuwazuru, Toyota, all of Japan

[73] Assignee: Taiho Kogyo Co., Ltd., Aichi, Japan

[21] Appl. No.: 548,760

[22] Filed: Nov. 4, 1983

[30] Foreign Application Priority Data

Nov. 8, 1982 [JP] Japan .................. 57-194559

[51] Int. Cl.³ .............................. F16C 33/12
[52] U.S. Cl. ................... 308/5 R; 384/279; 384/902; 384/907; 29/149.5 PM
[58] Field of Search .......... 308/5 R, 3 A, DIG. 5, 308/DIG. 8; 384/279, 379, 382, 383, 402, 408; 29/149.5 PM

[56] References Cited

U.S. PATENT DOCUMENTS

| 3,985,408 | 10/1976 | Bierlein et al. | 384/279 |
| 4,030,784 | 6/1977 | King et al. | 384/279 |
| 4,121,928 | 10/1978 | Mori | 29/149.5 PM |
| 4,290,655 | 9/1981 | Apuzzo et al. | 308/DIG. 5 |

FOREIGN PATENT DOCUMENTS 48-100541 12/1973 Japan .
51-74153 6/1976 Japan .
56-131861 10/1981 Japan .

OTHER PUBLICATIONS

"Luzex 450".
"SE-3f-Type All-Purpose Surface-Shape Tester Equipped with a Roughness Analyzer".

Primary Examiner—Lenard A. Footland
Attorney, Agent, or Firm—Armstrong, Nikaido, Marmelstein & Kubovcik

[57] ABSTRACT

The present invention relates to a sliding member having a novel micropore structure and an improved seizure resistance and seal property. Conventionally, the surface roughness of a sliding member is defined by, for example, maximum and/or average roughness. In the present invention, first, there is prepared a sliding member which has a hardness of at least HRc 50 and has micropores for determining the surface roughness of the sliding surface thereof, wherein the micropores, when measured with a particle counter, are present essentially in an amount ranging from 5% to 40% based on an area of the sliding surface and ranging from 2,000 to 150,000 per mm² on the sliding surface and have a diameter of at least 0.5 μm. A top portion of ridges which define the micropores is slightly rounded, thereby providing flat or round configuration in terms of the relative load curve, the relative load curve being defined by the accumulative percentage ($t_k$) and the cutting depth ($CV_k$) and the accumulative percentage ($t_k$) being both: an accumulative percentage ($t_k$) of 5% or less at a cutting depth ($CV_k$) of less than 1 μm and an accumulative percentage ($t_k$) of more than 5% but less than 40% at a cutting depth of less than 0.5 μm.

19 Claims, 6 Drawing Figures

SLIDING MEMBER HAVING A NOVEL PORE STRUCTURE ON THE SLIDING SURFACE THEREOF

BACKGROUND OF THE INVENTION

1. Field of the Invention

The present invention relates to a sliding member. More particularly, the present invention relates to a sliding member which is provided with micropores on the sliding surface thereof, thereby having a novel structure and improving the sliding characteristics under such severe sliding conditions as a high sliding speed, a high surface pressure, and a small amount of lubricating oil, so that the seizure resistance and the seal property of the sliding member are considerably enhanced.

2. Description of the Prior Art

The main trend in the development of sliding members has been to improve the material and structure of such members. Recently, a few proposals have been made to subject sliding members to surface treatment so as to improve their sliding characteristics.

Japanese Unexamined Patent Publication No. 51-74153/76 proposes that bearing material for use as a thrust washer be surface-roughened and then subjected to anode oxidation so as to form an uneven surface and so as to retain lubricating oil in the concave portions of such a surface.

Japanese Unexamined Patent Publication No. 48-100541/73 proposes to improve the sliding characteristics of a slide bearing by means of shot blasting.

Japanese Unexamined Patent Publication No. 56-131861/81 proposes to electrolytically deposit chromium on either a stationary member or a movable member of a mechanical seal or both so as to improve the seal property thereof.

According to the prior art for surface-treating sliding members, the degree of surface treatment or the structure of the micropores is mainly defined by the maximum height $R_{max}$ and the average roughness of ten points $R_z$ and is occasionally defined by the diameter of the micropores or the number of micropores per unit area. The $R_{max}$ and the like are measured with a conventional roughness tester.

Recently, a measuring device, which is referred to as a particle counter or a particle analyzer, has been put to practical use. The particle counter or particle analyzer involves a principle, according to a catalogue published by the Japanese corporation "LUZEX", that an image of particles is detected by a microscope and is converted to a video signal by means of a television camera. The image of the particles is then transmitted to a shade-correcting circuit, and a nonuniform brightness resulting from nonuniform lighting by the microscope and the nonuniform sensitivity of the television camera is corrected, thereby rendering the image of the particles uniformly bright. The image of the particles is then transmitted to a threshold circuit, from which the image of the particles to be measured is extracted and is converted to a binary image. That is, the image of the particles to be measured and the image of the particles not to be measured are completely separated by their densities in the threshold circuit. The binary image is transmitted to a counter circuit, in which the image of the particles included in a frame for determining the measuring field is selected. The thus-selected image of the particles is measured with regard to the number, area, and intersections thereof, as well as the area of the frame. By means of the above-described particle counter or the like, it is possible to accurately measure the number, area, average area, intersections, particle-diameter distribution, and the like any kind of particles, even particles which cannot be measured by means of a conventional roughness tester or the like.

SUMMARY OF THE INVENTION

It is an object of the present invention to provide a sliding member which has a novel micropore structure, thereby improving the seizure resistance and the real property of the sliding member.

It is another object of the present invention to define the structure of the micropores by other than $R_{max}$ and $R_z$, thereby improving the seizure resistance and the seal property.

It is a further object of the present invention to provide a sliding member having micropore structure which has specifically combined parameters, such as the surface percentage of, the number of, and the diameter of the micropores, as well as the shape of the ridges defined by the relative load curve.

In accordance with the objects of the present invention, there is provided a sliding member which has a hardness of at least HRc 50 and has micropores for determining the surface roughness of the sliding surface thereof, wherein the micropores, when measured with a particle counter, in an amount ranging from 5% to 40% based on an area of the sliding surface and ranging from 2,000 to 150,000 per mm$^2$ on the sliding surface and have a diameter of at least 0.5 μm and further have a top portion of the ridges which define the micropores and which have a high flatness in terms of the relative load curve, the relative load curve being defined by the cutting depth ($CV_k$) and the accumulative percentage ($t_k$) being defined by:

$$t_k = \frac{l_1 + l_2 + \ldots + l_k}{L} \times 100(\%),$$

wherein L is the standard measuring length of the sliding member extending in a direction parallel to the sliding surface, k is a number not greater than a predetermined number of divided sections of the ridges which are divided by imaginary lines extending parallel to an average roughness line, the cutting depth ($CV_k$) is the distance between the top imaginary line which passes over the top of the highest ridge and the k th imaginary line which passes over one or more of the ridges, and $l_k$ is the total length of the ridges which are cut by the k th imaginary line corresponding to the cutting depth $CV_k$. The flatness in terms of the relative load curve is defined by both: an accumulative percentage ($t_k$) of 5% or less at a cutting depth ($CV_k$) of less than 1 μm and an accumulative percentage ($t_k$) of more than 5% but less than 40% at a cutting depth ($CV_k$) of less than 0.5 μm.

According to the present invention, for determining the surface percentage of, the number of, and the diameter of the micropores, not a conventional surface-roughness tester using a mechanical probe but a particle counter is employed since the accuracy of a conventional surface-roughness tester is restricted due to a mechanical probe, and, therefore, the structure of the micropores, which decisively influences the sliding characteristic, cannot be defined.

The relative load curve is explained with reference to FIG. 1A and FIG. 1B, which schematically show the surface roughness and the relative load curve, respectively.

Figure 1:
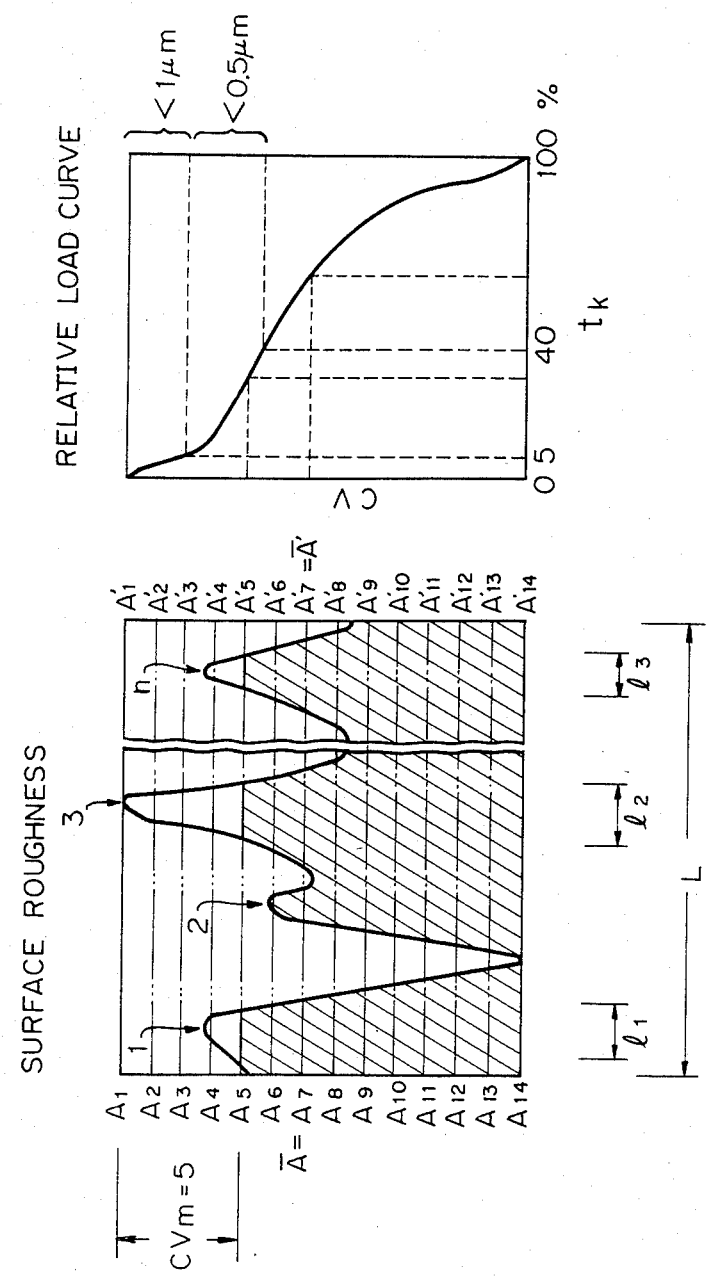
FIGS. 1A and 1B schematically illustrate the surface roughness and the relative load curve, respectively.

The symbol "n" in FIG. 1A indicates the n th ridge of the surface roughness. The third ridge is the highest in FIG. 1A. The symbol "L" in FIG. 1A indicates the standard measuring length. The line between the symbol $\overline{A}=A_5$ is and the symbol $A'_5=\overline{A}'$ an average roughness line drawn parallel to the test piece. The symbol "CV" in FIG. 1B indicates the cutting depth, i.e., the loading length (the height of a ridge or the depth of a groove) measured from the top of the highest ridge, i.e., the third ridge, in FIG. 1A. The symbol "$CV_m$" in FIG. 1A indicates the cutting length measured between the line $A_1$—$A_1'$ which passes over the top of the highest ridge and the line $A_m$—$A_m'$ (m=1 to 14) which passes over a predetermined m th, section of the surface roughness, the line $A_1$—$A_1'$ and the line $A_m$—$A_m'$ being parallel to the average roughness line. The symbol "$l_m$" in FIG. 1A indicates the total length of the n ridges (four ridges in the drawing) which are imaginarily cut by the line $A_m$—$A_m'$ determining the cutting depth $CV_m$. The number "m" in FIG. 1A is five. The ridges cut by the line $A_5$—$A_5'$ are hatched. The relative load length $t_k$ is defined by the equation:

$$t_k = \frac{l_1 + l_2 + \ldots + l_k}{L} \times 100 \, (\%)$$

wherein $k \leq m$ and wherein at $k=m$, (CV ranges from $A_1$—$A_1'$ to $A_{14}$—$A_{14}'$) $t_k$ is equal to 100%. The number "k" in FIG. 1A is three. The flatness according to the present invention, i.e., $t_k \leq 5\%$ at $CV_k < 1$ μm, and $t_k > 5\%$ and $< 40\%$ at $CV_k < 0.5$ μm, are shown in FIG. 1B.

According to the present invention, the percentage of micropores based on the area of a sliding surface is at least from 5% to 40% at the most since at less than 5% the micropores are not effective for improving the sliding characteristics over those attained by conventional methods for adjusting the surface roughness and since at more than 40% the seizure resistance decreases. In addition, the number of micropores per mm² of a sliding surface is from 2,000 to 150,000 since at less than 2,000 the micropores are not effective for improving the sliding characteristics over those attained by conventional methods and since at more than 150,000 individual micropores must be very small to fulfill the requirement for the above-described percentage, with the result that the micropores can be deemed to hide in the sliding surface, that is, the sliding surface can only have a conventional surface roughness which is not very effective for the sliding characteristics. Furthermore, the micropores have a diameter of at least 0.5 μm since at less than 0.5 μm the amount of lubricating oil retained in the micropores is very small. The flatness of the ridges at the top portion thereof according to the present invention, i.e., the accumulative percentage $(t_k) \leq 5\%$ at a cutting depth $(CV_k) < 1$ μm and the accumulative percentage $(t_k) > 5\%$ and $< 40\%$ at a cutting depth $(CV_k) < 0.5$ μm, imparts a flat on slightly rounded shape to the top portions of the ridges, thereby drastically enhancing the seizure resistance and seal property.

A method for forming micropores according to the present invention may comprise the steps of forming, on a cast, forged, or rolled product, pores which essentially satisfy the claimed percentage of, number of, and diameter of the micropores and subsequently slightly smoothening or rounding the tops of the ridges of the above pores or the like, thereby attaining an accumulative percentage $(t_k) \leq 5\%$ at a cutting depth $(CV_k) < 1$ μm and an accumulative percentage $(t_k) > 5\%$ but $< 40\%$ at a cutting depth $(CV_k) < 0.5$ μm.

According to the conventional methods for surface-finishing metallic acticles, a cast, forged, or rolled product is successively subjected to steps of making the surface smoother in such a manner that rough grooves or scratches are repeatedly substituted with smooth grooves or scratches. In this case, the tops of the ridges are neither smoothened nor rounded, but the new ridges have very steep configurations at the tops thereof. In one aspect of the present invention, such grooves are converted to the claimed micropores or the claimed micropores are formed while essentially maintaining such grooves.

A preferred method for forming pores on a cast, forged, or rolled product is to grind or polish such product.

A method for forming the micropores and smoothening or rounding the tops of the ridges of micropores consists of lapping with the aid of abrasives made of alumina particles having a diameter of 30 μm and subsequently polishing with the aid of alumina particles having a diameter of 0.3 μm.

When micropores are to be formed on a surface of ceramic material, for example, alumina, alumina powder is sintered under a condition which provides a high porosity percentage. The sintered product is then lapped so as to smoothen or round the tops of the ridges of the micropores.

DESCRIPTION OF THE PREFERRED EMBODIMENTS

A sliding member according to the present invention may consist of iron-based material such as carbon steel, steel for structural use, bearing steel, gray cast iron, nodular graphite cast iron, or the like, aluminum-based material such as Al-Si, Al-Cu, Al-Mg, Al-Sn, Al-Pb, Al-Zn, or other Al alloys, or ceramic material such as carbide (SiC, TiC, WC, VC), nitride ($Si_3N_4$ or TiN), oxide ($SiO_2$, $Al_2O_3$), boride (TiB), or mullite. Aluminum-alloys are subjected to anode-oxidation so as to harden their surface at least HRc50.

A sliding member according to the present invention can be used as a member of a machine or apparatus, being in slidable contact with and displaced relative to an opposed member. In this case, desirable bearing characteristics are obtained when the number of micropores ranges from 10,000 to 100,000.

A sliding member according to the present invention can be used as either a stationary member or a movable member of a mechanical seal or both, the movable member being rotatably pressed against a surface portion of the stationary member and being secured to a rotating shaft which is rotated relative to the stationary member, which is rigidly secured to the mechanical seal. In this case, a desirable seal property can be obtained when the micropores have a diameter of 100 μm or less, especially 30 μm or less, and are present from 1,000 to 100,000 per mm² and have an accumulative percentage ($t_k$) of 80% at a cutting depth ($CV_k$) of 0.5 μm or less.

A sliding member according to the present invention can be used as a member of a rotary compressor, a swash plate-type compressor, a thrust washer, a slide bearing, a valve guide, a floating- or semi-floating-type bearing of a supercharger, a mechanical seal of a supercharger or rotary pump, and the like. The advantages attained when a sliding member according to the present invention is used as a member of a rotary compressor, a swash plate-type compressor, or a mechanical seal are hereinafter described.

In a rotary compressor, conventionally, the rotor is made of iron-based material, such as SCM41, and the side plates are made of carbon steel or high Si aluminum alloy (Alusil alloy). When the blades and the rotor are rotated and slide relative to the side plates at, for example, from 6,000 to 7,000 rpm and a pressure amounting to from 200 to 400 kg/cm² is generated between the rotor blades and the side plates, as well as between the rotor and the side plates, the blades, the rotor, and the side plates undergo severe sliding, which can result in the seizure thereof. A sliding member according to the present invention which may consist of, e.g., SCM41, carbon steel, or high Si aluminum alloy is highly resistant to severe sliding and has a long life. A sliding member according to the present invention is further described in how it is effective for improving the sliding characteristics when used as the vanes of a rotary compressor. The vanes usually consist of chromium-bearing steel (SUJ2), molybdenum high-speed steel (SKH9), alumina ($Al_2O_3$), or another hard material having a hardness of Hv 700 or more. Occasionally, the vanes consist of high Si aluminum alloy (Alusil alloy), graphite, or heat-resistant resinous material (e.g., polyimide). The vanes slide relative to the rotor and are rotated together with the rotor while being in slidable contact with the side plates and the housing while the rotary compressor is being operated. During the operation of the rotary compressor, boundary lubrication is likely to occur between the vanes and an opposed member, such as a rotor, a housing and a side plate, with the result that the power of the rotary compressor is appreciably consumed and friction and seizure are likely to occur. When the micropores according the present invention are formed on a sliding surface consisting of one of the above-described materials, the friction between the vanes and the opposed member is reduced and seizure is unlikely to occur, presumably due to the tendency of boundary lubrication to be converted to mixed lubrication.

A swash plate-type compressor which can be operated under a lubricating condition with less and less lubricating oil has recently been designed. Therefore, when a swash plate-type compressor is used in a frigid zone or is initiated to be driven, the shoes and the swash plate slide relative to one another without the presence of lubricating oil therebetween. This involves a very great danger of seizure. The micropores according to the present invention can mitigate or prevent such danger, presumably due to the oil-retaining effects of the micropores. Shoes which have micropores according to the present invention may consist of conventional high Si-aluminum alloy, high-strength brass, chromium-bearing steel (SUJ 2), high-speed steels or carbon steels. The swash plate, which may be conventionally surface-finished or may have micropores according to the present invention, may consist of chromium-bearing steel (SUJ 2), cold-rolled mild steel (SPCC), carbon steel for structural use (S45C or S55C), high Si-aluminum alloy, gray cast iron (FC20), or nodular graphite cast iron.

A mechanical seal is used for providing a gas- or liquid-proof shaft assembly. Usually, a member made of graphite and a member made of carbon steel are assembled to manufacture a mechanical seal in which both members are pressed against and slide relative to each other at a high surface pressure and one of the members is rotated relative to the other member. The above-described mechanical seal is neither highly gas- or liquid-proof nor highly resistant to seizure if the members are conventionally surface-finished. When one of both of the above members have micropores according to the present invention, the gas- or liquid-proofness is enhanced, presumably because the surface-shape of the above members having micropores remains unchanged and the lubricating oil is retained in the micropores. In addition, the seizure resistance and the friction characteristics are considerably enhanced.

The micropores according to the present invention can be utilized for improving the sliding characteristics of any conventional materials, as well as materials having improved sliding characteristics per se, for example, those disclosed in Japanese Unexamined Patent Publication Nos. 58-64332 to 64336 and 58-67841 filed by the present assignee.

Although the terms "pores" and "micropores" are used hereinabove, it should be understood that these terms do not exclude unevennesses, minute indentations, minute holes, and the like which fall within the claimed definition.

The present invention is explained by way of examples and by referring to FIGS. 2 through 5.

EXAMPLE 1

In the present example and in the following examples, the micropores were measured with a "Luzex 450" (a particle analyzer produced by LUZEX Corporation) and with an "SE-3F-type all-purpose surface-shape tester equipped with a roughness analyzer" (a particle counter produced by Kosaka Research Laboratory) so as to determine their structure. In the "SE-3F-type all-purpose surface-shape tester equipped with a roughness analyzer", a DA-type detector (having an inner diameter of 8 mm, a depth of 24 mm, and a probe having a radius (R) of 5 μm and being made of a diamond) and a skid made of sapphire and having a radius (R) of 40 mm were used.

In the present example, specimens were made of SUJ-2 and had a surface hardness of HRC50 or more. The following results were obtained: the area of the micropores was from 10% to 30% based on the area of either side of the specimens; the number of micropores in such area was from 2,000 to 150,000 per mm²; the micropores were from 0.5 to 30 μm in diameter; and $t_k < 5\%$ at $CV_k = 0.5$ μm and $t_k =$ more than 5% to less than 40% at $CV_k<0.5$ μm. These results fell within the ranges of the present invention.

The specimens were subjected to a seizure test under the following conditions:

(1) Sliding Speed: constant at 15 m/sec.
(2) Load: 20 kg/cm² at first, then increased by 10 kg/cm² stepwise (each step lasted for 15 minutes)
(3) Lubricating Oil: mixed oil of 1 volumes of ice machine oil and 9 volumes of light oil
(4) Lubricating Method: lubricating oil was applied with felt at a rate of 0.8 ml/min.
(5) Opposed Member: aluminum alloy (16% Si, 4% Cu, the balance being Al); straightness, 1 μm or less; roughness, 0.4 to 0.6S.

Figure 2:
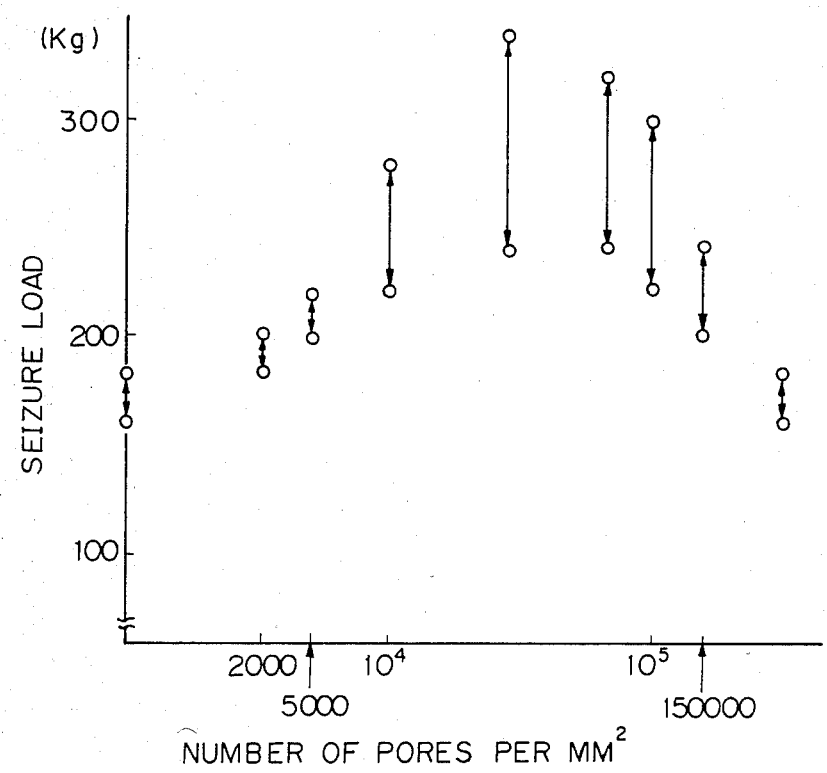
FIG. 2 is a semi-logarithmic graph illustrating the relationship between the number of micropores and the seizure load.

The measurement results are shown in FIG. 2. As is apparent from FIG. 2, the seizure load was high when the number of micropores was from 2,000 to 150,000/mm², especially from 10,000 to 100,000/mm².

EXAMPLE 2

Figure 3:
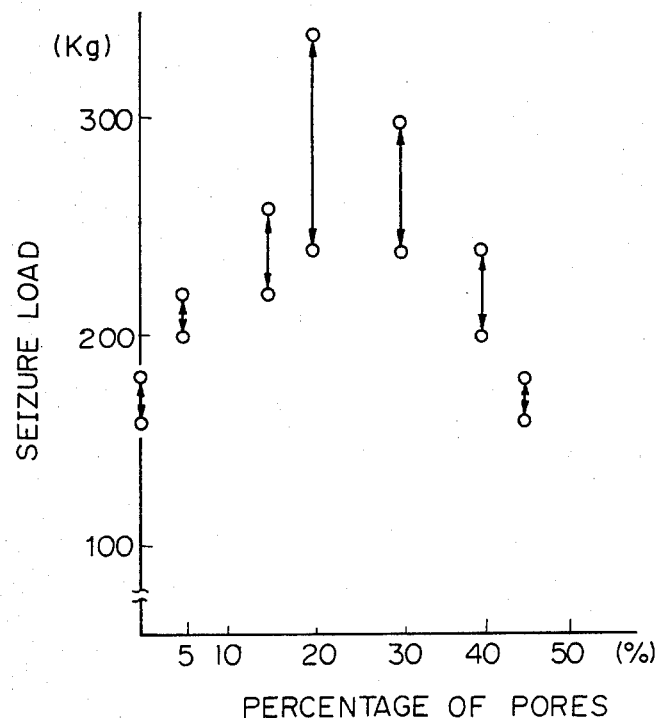
FIG. 3 is a graph illustrating the relationship between the area percentage of the micropores and the seizure load.

The same test as in Example 1 was carried out using specimens having the following features: the area percentage of the micropores varied as is shown in FIG. 3; the number of micropores was from 10,000 to 100,000/mm²; the micropores were from 0.5 to 100 μm in diameter; and $t_k \leq 5\%$ at $CV_k<1$ μm and $t_k>5\%$ but $<40\%$ at $CV_k<0.5$ μm. These features fell within the ranges of the present invention. The measurement results are shown in FIG. 3. As is apparent from Table 2, the seizure load was high when the area percentage was from 5% to 40%, especially from 15% to 30%.

EXAMPLE 3

Figure 4:
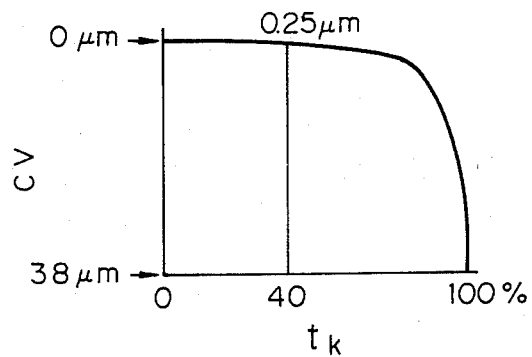
FIG. 4 shows a relative load curve at a magnification of 2,000.
Figure 5:
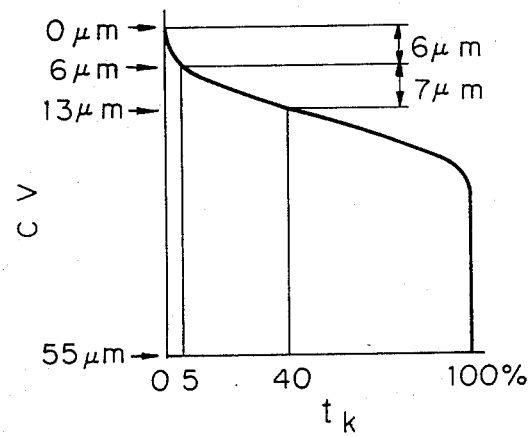
FIG. 5 shows a relative load curve at a magnification of 10,000.

The same test as in Example 1 was carried out using specimens of the present invention having the following features: the area percentage of the micropores was from 11% to 30%; the number of micropores was from 20,000 to 100,000/mm²; the diameter of the micropores was from 0.5 μm to 30 μm; and the relative load curve was as is shown in FIG. 4. For the purpose of comparison, specimens having the above-described features except for the relative load curve shown in FIG. 5 were prepared. The average seizure load of the samples according to the invention was 340 kg while the average seizure load of the comparative samples was 100 kg.

EXAMPLE 4

Four specimens having one specific $R_z$ of 1.50 μm and an area percentage and the like varied as is shown in Table 1 were prepared. Two of these specimens were subjected to lapping by the 30 μm alumina abrasives and then polishing by the 0.3 μm alumina abrasives so as to from micropores having rounded top of the ridges. The other two specimens were conventionally ground to form scratches. The seizure load of these samples was measured under the conditions described in Example 1.

TABLE 1

| | Area Percentage (%) | Number (mm⁻²) | Diameter (μm) | Relative Load Curve $t_k$ | Relative Load Curve $CV_k$ | Seizure Load (kg) |
|---|---|---|---|---|---|---|
| Invention | 20 | 70,000 | 0.5~20 | ≦5% | 0.2 μm | 200 |
| | | | | 5~40% | 0.4 μm | |
| | 25 | 100,000 | 0.5~30 | ≦5% | 0.9 μm | 340 |
| | | | | 5~40% | 0.4 μm | |
| Comparative Specimens | (0) | (0) | — | ≦5% | 0.8 μm | 80 |
| | (0) | (0) | — | 5~40% | 0.7 μm | 120 |
| | | | | ≦5% | 0.8 μm | |
| | | | | 5~40% | 0.55 mm | |

In the comparative samples which were subjected to only the conventional grinding, not micropores but long scratches were detected, and the ridges of the scratches had a steep top configuration.

Table 1 indicates that the seizure load was increased at least two fold by varying the accumulative percentage ($t_k$) and the cutting depth ($CV_k$).

EXAMPLE 5

Four specimens (SUJ 2) having hardness of HRC50 or more and an $R_z$ of from 0.2 μm to 0.4 μm were prepared. Two of those samples were further subjected to the lapping and polishing described in Example 4. The other two specimens were conventionally ground to form scratches and then polished to flatten the top portions of the scratches. The area percentage and the like of the micropores were varied as is shown in Table 2. The specimens were subjected to an oil-leakage test under the following conditions:

Testing Apparatus: an axial plunger-type compressor having a displacement of 1,488 cc and including a mechanical seal
Specimens: they were used as a sheet ring of the mechanical seal;
Opposed Member: a ring-form stationary member of the mechanical seal; 60% by weight of graphite powder having a grain size of 100 μm or less, 8% by weight of silicon dioxide powder having a grain size of 50 μm or less, and phenol resin (the remainder) were mixed, blended, and preformed in a ring form, the preform being compressed under a pressure of 350 kg/cm² in metal dies and then cured at 300° C. for 12 hours
Lubricating Oil: 148 ml of ice machine oil
Rotation Speed of Mechanical Seal: 2,000 rpm
Pressure: 2 kg/cm² (approximately 19 MPa)
Spring Load: 4 kg
Operation Time: 100 hours

TABLE 2

| | Area Percentage (%) | Number (mm⁻²) | Diameter (μm) | Relative Load Curve $t_k$ | Relative Load Curve $CV_k$ | Amount of Oil Leakage (g) |
|---|---|---|---|---|---|---|
| Invention | 17 | 75,000 | 0.5~10 | ≦5% | 0.2 μm | 0.01 |
| | | | | 5~40% | 0.1 μm | |
| | 8 | 5,000 | 0.5~30 | ≦5% | 0.1 μm | 0.025 |
| | | | | 5~40% | 0.1 μm | |
| Comparative Specimens | (0) | (0) | — | ≦5% | 0.25 μm | 0.32 |
| | | | | 5~40% | 0.25 μm | |
| | (0) | (0) | — | ≦5% | 0.3 μm | 0.38 |
| | | | | 5~40% | 0.3 μm | |

In the comparative specimens, not micropores but long scratches were detected. The cross sectional shape of these long scratches fell within the ranges of $t_k$ and $CV_k$ of the present invention, but the long scratches as seen in a top view extend across the substantially entire sliding surface of the sheetring and therefore does not fall within the claimed definition of the micropores. Therefore, it is apparent that by appropriately determining the four features of the micropores, the amount of the leakage of the lubricating oil could be decreased by one tenth or more.

We claim:

1. A sliding member which has a hardness of at least HRc 50 and has micropores for determining the surface roughness of the sliding surface thereof, wherein said micropores, when measured with a particle counter, in an amount ranging from 5% to 40% based on an area of the sliding surface and ranging from 2,000 to 150,000 per mm² of the sliding surface have a diameter of at least 0.5 μm and further have a top portion of ridges which define said micropores and which have a high flatness in terms of the relative load curve, said relative load curve being defined by an accumulative percentage ($t_k$) and a cutting depth ($CV_k$) and said accumulative percentage ($t_k$) being defined by:

$$t_k = \frac{l_1 + l_2 + \ldots + l_k}{L} \times 100(\%),$$

wherein L is the standard measuring length of the sliding member extending in a direction parallel to the sliding surface, k is a number not greater than a predetermined number of divided sections of the ridges which are divided by imaginary lines extending parallel to an average roughness line, the cutting depth ($CV_k$) is a distance between a top imaginary line which passes over a top of the highest ridge and a kth imaginary line which passes over one or more of the ridges, and $l_k$ is a total length of the ridges which are cut by the knth imaginary line corresponding to the cutting length $CV_k$, said flatness in terms of the relative load curve being defined by both: an accumulative percentage ($t_k$) of 5% or less at a cutting depth ($CV_k$) of less than 1 μm and an accumulative percentage ($t_k$) of more than 5% but less than 40% at a cutting depth ($CV_k$) of less than 0.5 μm.

2. A sliding member according to claim 1, said sliding member being in slidable contact with and being displaced relative to an opposed member.

3. A sliding member according to claim 2, said sliding member and said opposed member being a shoe and a swash plate or a shoe-housing, respectively, of a swash plate-type compressor.

4. A sliding member according to claim 2, said sliding member and said opposed member being a sliding bearing and another member respectively, of an internal-combustion engine.

5. A sliding member according to claim 2, said sliding member and said opposed member being a vane and a rotor, respectively, of a rotary compressor.

6. A sliding member according to claim 2, said sliding member and said opposed member being a vane and a housing or side plate, respectively, of a rotary compressor.

7. A sliding member according to claim 2, said sliding member and said opposed member being a rotor and a housing, respectively, of a rotary compressor.

8. A sliding member according to claim 2, wherein the number of said micropores is from 10,000 to 100,000 per mm².

9. A sliding member according to claim 1, said sliding member being either a stationary member or a movable member of a mechanical seal or both, said movable member being rotatably pressed against a surface portion of said stationary member and being secured to a rotating shaft which is rotated relative to said stationary member, which is rigidly secured to said mechanical seal.

10. A sliding member according to claim 9, wherein said cutting depth ($CV_k$) is 0.5 μm or less at the accumulative percentage ($t_k$) 80%.

11. A sliding member according to claim 9, wherein the number of said micropores is from 10,000 to 100,000 per mm².

12. A sliding member according to claim 9, wherein the diameter of said micropores is 30 μm at the most.

13. A sliding member according to claim 9, said sliding member consisting of iron-based material.

14. A sliding member according to claim 13, wherein the diameter of said micropores is 100 μm at the most.

15. A sliding member according to claim 9, said sliding member consisting of ceramic material.

16. A sliding member according to claim 1, said sliding member consisting of iron-based material.

17. A sliding member according to claim 1, said sliding member consisting of ceramic material.

18. A sliding member according to claim 8, 9, or 17, wherein the diameter of said micropores is 500 μm at the most.

19. A sliding member produce by the steps of: preparing a sliding body which has a hardness of at least HRc 50 and has micropores for determining the surface roughness of the sliding surface thereof, wherein said micropores, when measured with a particle counter, are present essentially in an amount ranging from 5% to 40% based on an area of the sliding surface and range from 20,000 to 150,000 per mm² on the sliding surface and have a diameter of at least 0.5 μm; and slightly rounding a top portion of ridges which define said micropores, thereby providing a flat or round configuration in terms of the relative load curve, said relative load curve being defined by an accumulative percentage ($t_k$) and a cutting depth ($CV_k$) and said accumulative percentage ($t_k$) being defined by:

$$t_k = \frac{l_1 + l_2 + \ldots + l_k}{L} \times 100(\%),$$

wherein L is the standard measuring length of the sliding member extending in a direction parallel to the sliding surface, k is a number not greater than a predetermined number of divided sections of the ridges which are divided by imaginary lines extending parallel to an average roughness line, the cutting depth ($CV_k$) is a distance between a top imaginary line which passes over the top of the highest ridge and the kth imaginary line which passes over one or more of the ridges, and $l_k$ is a total length of the ridges which are cut by the knth imaginary line corresponding to the cutting length $CV_k$, said flatness in terms of said relative load curve being defined by both: an accumulative percentage ($t_k$) of 5% or less at a cutting depth ($CV_k$) of less than 1 μm and an accumulative percentage ($t_k$) of more than 5% but less than 40% at a cutting depth of less than 0.5 μm.

* * * * *